US010354129B2

(12) United States Patent
Shamir et al.

(10) Patent No.: US 10,354,129 B2
(45) Date of Patent: *Jul. 16, 2019

(54) HAND GESTURE RECOGNITION FOR VIRTUAL REALITY AND AUGMENTED REALITY DEVICES

(71) Applicant: INTEL CORPORATION, Santa Clara, CA (US)

(72) Inventors: Oren Shamir, Jerusalem (IL); Ovadya Menadeva, Modiin (IL); Kfir Viente, Jerusalem (IL); Maoz Madmony, Beit Kama (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,148

(22) Filed: Jan. 3, 2017

(65) Prior Publication Data

US 2018/0189556 A1 Jul. 5, 2018

(51) Int. Cl.
*G06F 3/01* (2006.01)
*G06K 9/00* (2006.01)
*G06T 7/269* (2017.01)

(52) U.S. Cl.
CPC ......... *G06K 9/00355* (2013.01); *G06F 3/017* (2013.01); *G06T 7/269* (2017.01); *G06T 2207/10024* (2013.01); *G06T 2207/10048* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS 6,850,252 B1    2/2005  Hoffberg
8,203,605 B1 *  6/2012  Starner ............... G06F 1/163
                                          348/115
2012/0027252 A1  2/2012  Liu et al.
(Continued)

OTHER PUBLICATIONS

International Search Report for International Application PCT/US2016/059583 dated Dec. 19, 2016; 3 pages.

*Primary Examiner* — Kent W Chang
*Assistant Examiner* — Nathaniel P Brittingham
(74) *Attorney, Agent, or Firm* — International IP Law Group, P.L.L.C.

(57) ABSTRACT

A system for hand gesture recognition includes a display, camera, memory, and processor. When the processor is to execute instructions, the processor is to estimate one or more motion vectors of an object using a pair of consecutive frames and estimate an average motion vector of the object. The processor may also estimate an average motion vector of the object, determine a first histogram of optical flow (HOOF) based on the one or more motion vectors and the average motion vector, determine depth values based on motion vectors from the first HOOF, and determine a second histogram of optical flow (HOOF) based on the depth values. The processor is also to obtain a descriptor based on histogram values from a histogram of optical flow (HOOF) of the one or more motion vectors, a shape descriptor, and the average motion vector and classify the descriptor as a gesture.

25 Claims, 8 Drawing Sheets

(56) References Cited

U.S. PATENT DOCUMENTS

| | | |
|---|---|---|
| 2012/0033132 A1* | 2/2012 | Chen .................. G11B 27/28 |
| | | 348/462 |
| 2012/0086864 A1 | 4/2012 | Williams et al. |
| 2012/0219213 A1* | 8/2012 | Wang ............... G06K 9/00335 |
| | | 382/159 |
| 2012/0314772 A1 | 12/2012 | Chen |
| 2013/0156348 A1* | 6/2013 | Irani ............... G06F 17/30244 |
| | | 382/305 |
| 2013/0271397 A1* | 10/2013 | Macdougall .......... G06F 3/017 |
| | | 345/173 |
| 2015/0116597 A1* | 4/2015 | Chandraker .......... H04N 5/147 |
| | | 348/699 |
| 2015/0243038 A1 | 8/2015 | Zhao |
| 2016/0148391 A1* | 5/2016 | Chua ............... G06K 9/00342 |
| | | 382/103 |
| 2017/0182406 A1* | 6/2017 | Castiglia ............ A63F 13/213 |
| 2017/0185166 A1* | 6/2017 | Madmony ........... G06F 3/0304 |
| 2017/0192515 A1* | 7/2017 | Menadeva ............ G06F 3/017 |

* cited by examiner

500

600

HAND GESTURE RECOGNITION FOR VIRTUAL REALITY AND AUGMENTED REALITY DEVICES

BACKGROUND ART

Electronic devices can enable computer vision by duplicating the abilities of human vision by electronically perceiving and understanding an image. In some cases, the electronic device will follow or track the movements of a set of interest points or objects in an image sequence. In particular, the electronic device can track the movements of a human hand to implement a user-interface with the electronic device. The ability to provide a hand-tracking mechanism is fundamental in implementing a natural user interface based on hand gestures. This is especially true in Virtual Reality (VR) and Augmented Reality (AR) applications. A gesture recognition mechanism is crucial to enabling a natural user interface in such applications.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
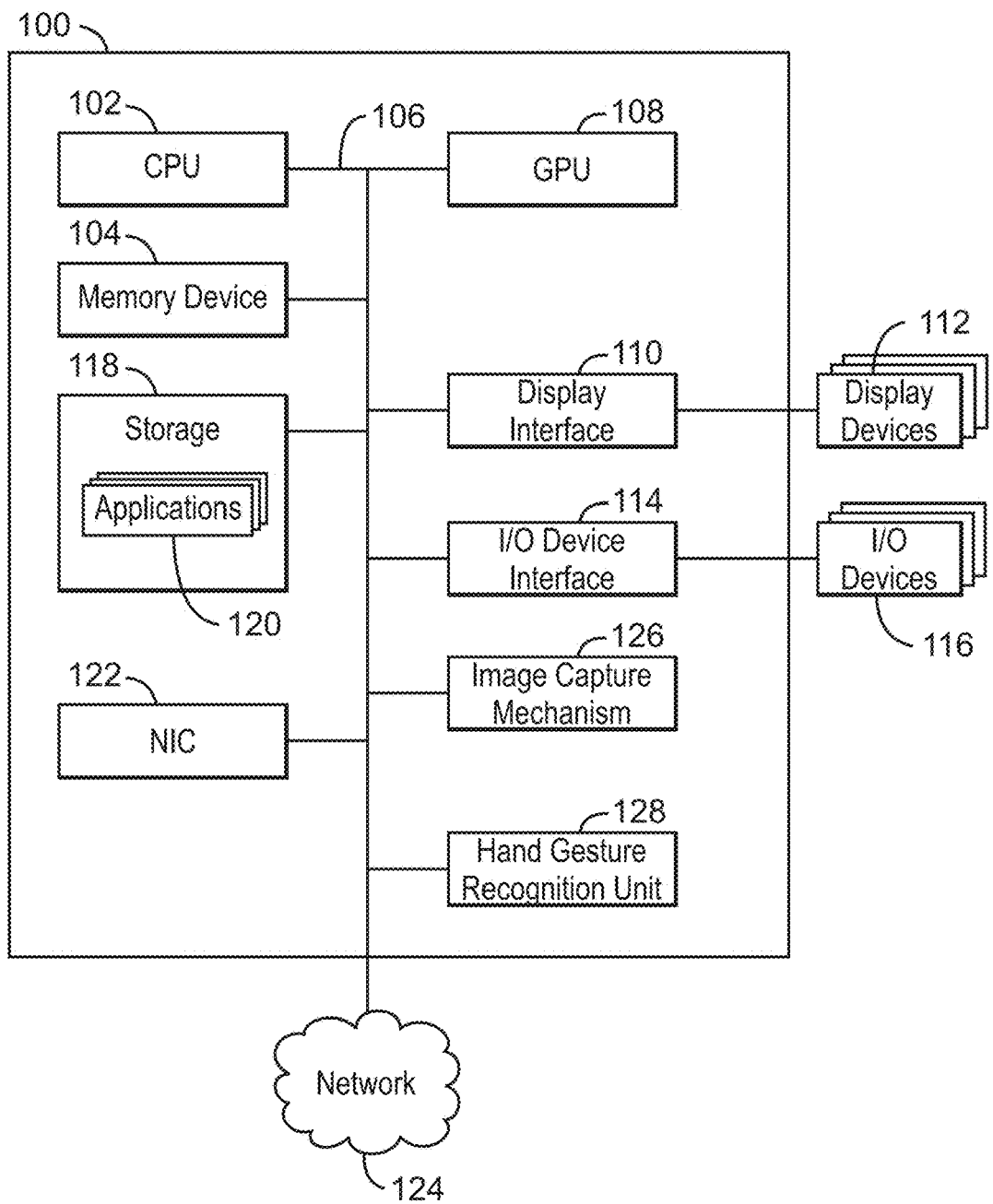
FIG. 1 is a block diagram of an electronic device that can be used to enable hand gesture recognition for virtual reality and augmented reality devices.

As discussed above, a hand-tracking mechanism is used to implement a natural user interface with an electronic device based on hand gestures. Hand gestures can be determined via a variety of algorithms. For example, in some cases, a three dimensional (3D) model algorithm, skeletal model algorithm, or an appearance based algorithm is used to recognize hand gestures. The 3D model and the skeleton based algorithms demand accurate and robust tracking of the hand. Implementing a 3D model is a complex task and often the output from such algorithm is very noisy and inaccurate in non-deterministic way. The appearance based algorithm derives information directly from the image and the uses spatial features such as gradients, template matching, and the like. Appearance based algorithms are mainly used for posture recognition and depend on an invariant characteristic, such as rotation, scale, and the like, of the features. Additionally, the use of hand gestures may often be used with devices such as head-mounted displays. The devices may be used to implement virtual reality functionality and augmented reality functionality.

Embodiments described herein enable hand gesture recognition for virtual reality functionality and augmented reality functionality. In embodiments, a main motion vector of an object is analyzed. In order to evaluate the main movement of the object, an optical flow algorithm is used to track pixels on an object mask. A specific point is not tracked, rather a main motion vector of the object is calculated and used to apply movement to a rendered representation in a virtual reality or augmented reality environment. To accurately describe and recognize the gesture as performed by the object, a histogram of optical flow is calculated for each of an image plane and a depth plane. A descriptor may be generated based on the motion vector, both histograms of optical flow, and a shape descriptor. The descriptor may then be classified as a gesture. In embodiments, the object may be a hand. While the present techniques may refer to a hand and hand gestures, gestures with an object may also be used.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

FIG. 1 is a block diagram of an electronic device 100 that can be used to enable hand gesture recognition for virtual reality and augmented reality devices. The electronic device 100 can be, for example, a laptop computer, desktop computer, tablet computer, mobile device, or server, among others. In particular, the electronic device 100 can be a mobile device such as a cellular phone, a smartphone, a personal digital assistant (PDA), phablet, or a tablet. Additionally, the electronic device 100 can be any device that is to track various hands, limbs, or objects, such as a gaming console or a component of a gaming console. The electronic device 100 can include a central processing unit (CPU) 102 that is configured to execute stored instructions, as well as a memory device 104 that stores instructions that are executable by the CPU 102. The CPU can be coupled to the memory device 104 by a bus 106. Additionally, the CPU 102 can be a single core processor, a multi-core processor, a computing cluster, or any number of other configurations. Furthermore, the electronic device 100 can include more than one CPU 102. The memory device 104 can include random access memory (RAM), read only memory (ROM), flash memory, or any other suitable memory systems. For example, the memory device 104 can include dynamic random access memory (DRAM).

The electronic device 100 can also include a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a storage device 118. The storage device 118 is a physical memory such as a hard drive, a solid state drive, an optical drive, a thumbdrive, an array of drives, or any combinations thereof. The storage device 118 can also include remote storage drives such as used for cloud computing applications. The storage device 118 includes any number of applications 120 that are configured to run on the electronic device 100. In embodiments, the applications may be a plurality of applications that enables video game play or gesture based interaction with an electronic device.

The electronic device 100 can also include a network interface controller (NIC) 122. The NIC 122 can be configured to connect the electronic device 100 through the bus 106 to a network 124. The network 124 can be a wide area network (WAN), local area network (LAN), or the Internet, among others. The electronic device 100 also includes an image capture mechanism 126. In some examples, the image capture mechanism 126 is a camera, three-dimensional (3D) camera, stereoscopic camera, scanner, infrared camera/sensor, heat dissipation camera, radar, or the like. The image capture mechanism 126 may capture depth, infrared, or color images of a scene. Additionally, the image capture mechanism may be a three-dimensional camera.

The electronic device 100 also includes a hand gesture recognition unit 128. The hand gesture recognition unit 128 may obtain images from the image capture mechanism 126. The image capture mechanism may be used to capture a scene, where the scene includes a field of view of the camera or a portion of the field of view of the camera. The scene may be captured as a series of frames. In embodiments, the hand gesture recognition unit 128 is to detect gestures based on depth and Infra-Red/Color images coming from the image capture mechanism 126. The present techniques recognize hand gestures using a depth data and IR/Color images, utilizing each gesture as a reliable action. Specifically, the hand gesture recognition unit 128 applies a robust algorithm to a sequence of frames from the image capture mechanism 126 in a frame to frame manner, and uses hand tracking to obtain a mask of the tracked hand. A histogram of optical flow based descriptor is obtained, and the descriptor is normalized and used to output a gesture event. The histogram includes a plurality of histograms from each plane of movement of the hand. The descriptor obtained according to the present techniques is a descriptor that that combines depth, infrared, and/or RGB data. In embodiments, normalizing the descriptor includes converting descriptor values from pixels to meter units.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

In embodiments, the image capture mechanism is used to obtain depth information of a scene. The depth information enables an accurate mask of a hand in the scene to be obtained. Using the depth data in order to obtain a mask of the hand removes the noise typically caused by various backgrounds. As used herein, the mask or contour of the hand may be the portion of the hand that defines a silhouette of the hand. A histogram of optical flow (HOOF) based descriptor is built using an optical flow algorithm on estimated motion vectors, such as the Lucas-Kanade optical flow algorithm. The motion vectors are estimated for an X/Y image plane as well as a Y/Z depth plane. In embodiments, a Lucas-Kanade optical flow algorithm is used to find corresponding points on the current frame image and a next frame. The Lucas-Kanade algorithm assumes that the flow is essentially constant in a local neighborhood of the pixel under consideration, and solves a set of basic optical flow equations for all the pixels in that neighborhood using the least squares criterion. The descriptor values may be normalized to meter units. In embodiments, the descriptor values are converted from pixel to meter units. Additionally, in embodiments, the descriptor values can be flipped horizontally and vertically in a very intuitive and fast manner. Flipping the descriptor values may be used to simulate descriptor values for the opposite hand, thus making descriptor values the same for each hand, regardless of the type of hand.

Previously, hand gestures were recognized using a classification of multi-frame motion vector data via histograms of motion vectors in the image plane. The use of histograms of motion vectors in the image plane may be limited since such an implementation is based primarily on two-dimensional (2D) data. For example, hand tapping (pushing forward & back) movements, may often be misclassified as hand opening and closing when using 2D data. Further, quick hand movements or noise greatly reduced the gesture detection rate, and camera movements was not supported.

The present techniques use histograms that incorporate depth data, as well as a descriptor that captures the shape of the hand. Together, these three pieces of the descriptor significantly improve gesture recognition performance, especially under noisy conditions, and while the camera is moving. According to the present techniques, hand tapping (pushing forward & back) movements are properly classified. Further, quick hand movements or noise do not reduce detection rate. Moreover, camera movement is supported.

In the specific case of a virtual reality implementation, the shape descriptor is especially helpful, since a large portion of the fingers may be obscured by the hand itself. During quick movements, motion vectors are often noisy and do not contain sufficient data to robustly discriminate between gestures, since much of the movement may be obscured. Since shape data does not rely upon motion vectors, it provides an important addition to the motion-vector-based descriptor data. Another issue that is new for virtual reality environments is the requirement to work in an environment that contains a lot of global motion—motion caused from movement of the camera and not the hands themselves. The camera moving towards or away from the hand, for instance, may generate motion vectors very similar to hand opening and closing (respectively) when only motion vectors in the image plane (X/Y) are considered. The addition of depth (Y/Z) histograms enables a classifier to effectively learn the difference between such global motions and the gestures to be recognized.

Figure 2:
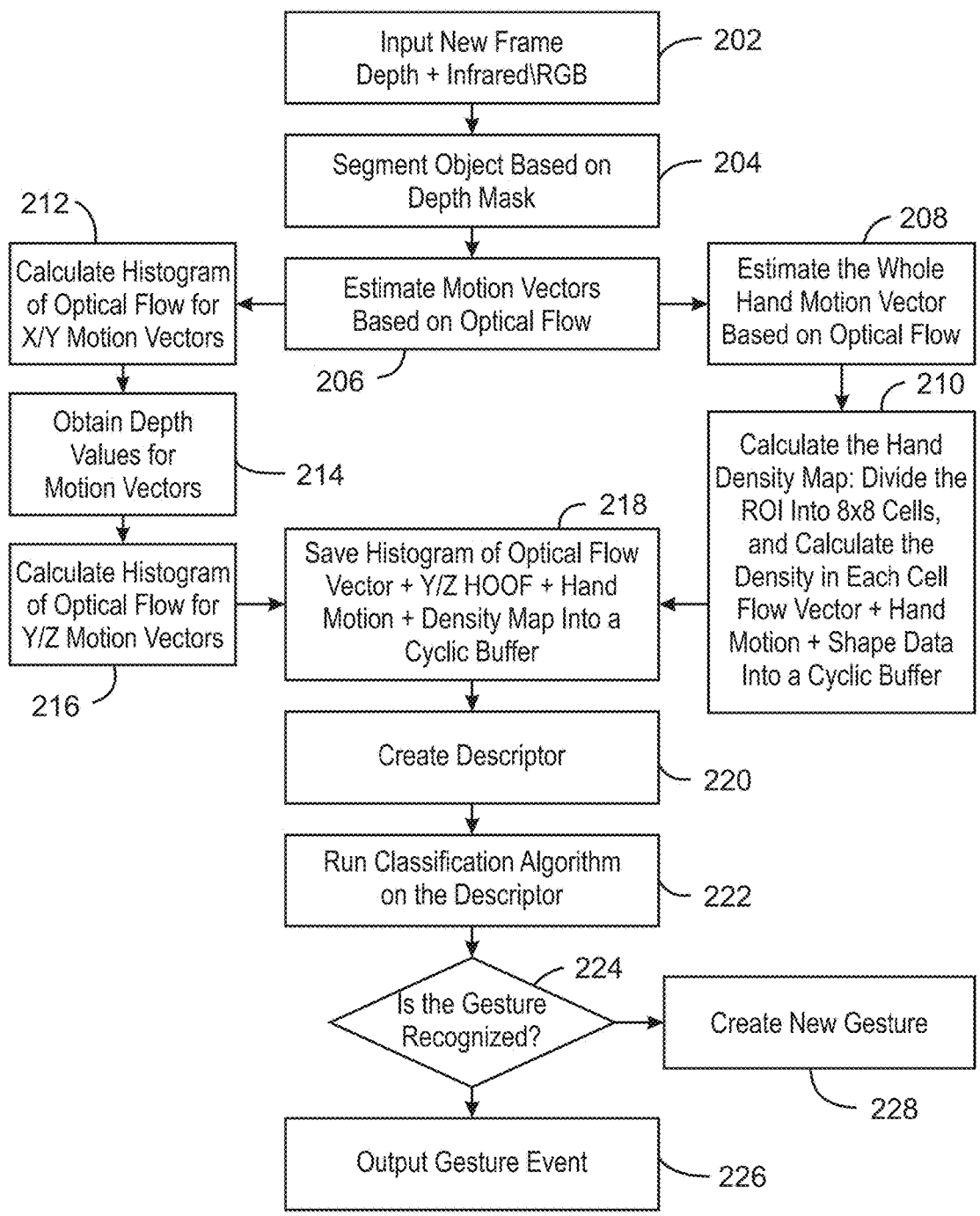
FIG. 2 is a process flow diagram of a method for gesture classification.

FIG. 2 is a process flow diagram of a method 200 for gesture classification. At block 202, a new frame is input to the system. The new frame may include depth data, infrared (IR) data, and/or RGB data. The depth data, infrared (IR) data, and RGB data may be referred to as a depth image, infrared (IR) image, and RGB image, respectively. At block 204, the hand is segmented using the depth image. In embodiments, the hand is segmented from the background such that an accurate mask of the hand aligns with the IR image or an RGB image. In embodiments, the depth image may be a depth map or any other image representation that provides depth information. In embodiments, any algorithm that extracts the object from the background can be used to segment or extract the object from an image.

At block 206, motion vectors are estimated based on the optical flow. In embodiments, the intersection of the feature points with the hand mask are tracked to estimate the motion vectors. To estimate motion vectors, the hand mask may be extracted using a background subtractor algorithm, an extractor algorithm, or the like. In embodiments, a Lukas-Kanade optical flow is computed on the IR/RGB image, intersecting the tracked feature points with the hand mask. Source points for optical flow are found either by finding good feature points are found on the extracted mask, or by applying a grid over the mask and using all points on the grid. Then the optical flow algorithm is to track these points in both the image plane (X/Y) and the depth plane (Y/Z). After running the optical flow, for each point found there is a motion vector that describes the movement of the hand. In embodiments, the optical flow is applied to an IR image, RGB image, grayscale image or any combination thereof for a pair of frames where the mask found using the depth image has been applied to the frames.

At block 208, whole hand motion vectors are estimated based on the optical flow. In particular, the hand motion vector to the frame feature vector may be computed, and a hand motion vector is calculated. The whole hand motion vector may be obtained from any sort of frame to frame object tracking, such as a cursor tracker. The whole hand motion vectors can be estimated using as input the IR images or the RGB images. The optical flows at block 206 can be used to obtain the whole hand motion vectors. Specifically, good feature points of the object are found on the IR images or the RGB images. In embodiments, the good feature points may be obtained via corner detection, or via projecting a grid over the region of interest and using points at grid intersections. An optical flow algorithm may be ran on the chosen tracking points. The motion vectors, determined by the optical flow, may be sorted by size.

A predefined threshold is applied to the sorted motion vectors, where the threshold (TH) may be expressed as a percentage in order to select a lowest percent of motion vectors. For example, if TH=0.5 with a total of 50 motion vectors assorted in an ascending manner, the first 25 motion vectors are selected from the sorted array of motion vectors. A mean motion vector is then calculated using the selected motion vectors. The optical flow results in a number of motion vectors including an x and y values. These motion vectors are averaged to find average x and y values. A third z value can be calculated using the depth information. The resultant mean motion vector (x, y, z) represents the estimated object movement via a whole hand motion vector, and includes three values. In embodiments, the whole hand motion vector may be calculated by via frame to frame object tracking.

At block 210, a shape descriptor is found. In embodiments, the shape descriptor is found by calculating a hand density map. The hand density map may be calculated by dividing a region of interest (ROI) including the hand mask into a number of cells and then calculating the density of hand data points in each cell. For example, the ROI may be divided into 8×8 cells and the density in each cell is calculated. The value of each cell is the percent of pixels in it which intersect the hand mask. In embodiments, the cyclic history buffer is used to store the last n density sets. For example, if n=20, the densities calculated for the last twenty frames are saved, with new frames overriding the old frames in a cyclic manner. The shape descriptor may be calculated using a variety of techniques, including a histogram of oriented gradients (HOG), a Region-based Shape Descriptor (RSD), Contour-based Shape Descriptor (CSD), 3-D Shape Descriptor (3-D SD), and the like. The shape descriptor may be used in the final descriptor at block 218.

At block 212, a histogram of the optical flow for the X/Y motion vectors are calculated. To construct the histogram, a range of possible values are placed into a bin. In other words, the entire range of values is divided into a series of intervals, the number of values that fall into each interval are counted. The bins are may be expressed as consecutive, non-overlapping intervals of a variable. In embodiments, a bounding box is applied to the hand mask, and then divided into a grid. In embodiments, the grid may be a 3×3 cell grid. For each cell in the grid, an 8-bin histogram of X/Y (image space) optical flow (HOOF) is calculated for all motion vectors. In embodiments, the 8-bin histogram is 8 bins of 45 degrees. The values of each histogram are divided by the number of motion vectors that were used to build the respective histogram to calculate an average value of each bin, for each cell of the grid. For example, an 8-bin histogram would have eight average values for each bin, for each cell in a nine cell grid, for a total of 72 values.

Accordingly, the nine HOOFs may be concatenated to one vector. In other words, the histogram values for each cell are linked into a single frame descriptor. For exemplary purposes, the grid is a 3×3 grid, with nine cells and nine HOOFs calculated. However, and number of cells can be used. Moreover, the bounding box can be divided in any fashion, and is not restricted to a grid like form. Combining the nine HOOFs into one vector results in a histogram based optical flow vector or a single frame X/Y feature vector. In embodiments, the 9 HOOFs of X/Y, and 9 HOOFS of Y/Z, and the shape descriptor will all be linked into a single frame descriptor.

At block 214, the depth (Z) component of the source and destination points of optical flow is obtained. Depth values may be calculated or retrieved directly from the camera in the case of a depth camera. In embodiments, motion vectors where depth value is an outlier related to surrounding pixels in the hand mask are discarded. Outliers may be determined by applying a threshold relative to the depth of the entire mask. Specifically, depth data for pixels that are above an average depth value for surrounding pixels may be determined to be an outlier. At block 216, similar to block 212, the hand mask is split using a 3×3 grid and for each cell in the grid calculate an 8-bins histogram of Y/Z (image-space) optical flow for all the motion vectors using the depth values obtained at block 214. Afterwards, the nine HOOFs may be concatenated into one vector.

At block 218, the vector of HOOFs for X/Y, the vector of HOOFs for Y/Z, the hand density map and the hand motion vector are saved into a cyclic history buffer. In embodiments, the vector of HOOFs is saved with the whole hand motion vector into a cyclic history buffer. In embodiments, the cyclic history buffer is used to store the last n descriptor vectors. For example, if n=20, the vectors calculated for the last twenty frames are saved, with new frames overriding the old frames in a cyclic manner.

At block 220, a descriptor is created by concatenating the last K frames from the vector of HOOFs for X/Y, the vector of HOOFs for Y/Z, the hand density map and the hand motion vector. The descriptor is created based on the histogram of the optical flow vector, the whole hand motion vector, and the two HOOFs. In embodiments, the whole hand motion vector is added to the histogram based optical flow vector or a single frame feature vector for each frame. A descriptor may be a structure containing information that describes the data. In the present techniques, the descriptor describes the movement of the hand. From observing or analyzing the values in the descriptor, the movement in each frame can be represented. In embodiments, the descriptor may be created by concatenating the last K vectors, where the vectors are stored in the cyclic history buffer. In order to detect that a gesture has occurred, data is collected from at least the K previous frames. For each frame, the frame descriptor is saved to a buffer after concatenating the last K vectors. To detect if gesture is occurring or has occurred, the full descriptor is built. In embodiments, the size of a full descriptor is K*211, where K is a number of previous frames. In embodiments, the value of K is determined when building the classifier, and the value of K can depend on the time it takes to perform the gesture.

For example, a descriptor of the frame may be a vector of 211 values. The first 72 values are the HOOF for X/Y dimensions; the next 72 values are HOOF in the Y/Z dimension. The descriptor may contain 72 values from each of the nine histograms that are calculated at block 212 and 216, where each of the nine cells of the grid includes eight bins, such that 9*8=72. Three additional values may be added to the descriptor that represent the whole hand motion vector as found at block 210. The next 64 values are the hand density map, where one value is obtained for each cell of a grid. As a result, in embodiments, the total length of a single frame descriptor is 72+72+3+64=211 values. To obtain the full descriptor, the single frame descriptor for K frames can be combined, such that the full descriptor is K*211 values.

At block 222, a classification algorithm may be ran on the descriptors. The classification algorithm may be used to determine the particular gesture that has occurred. At block 224 it is determined if the gesture is a recognized gesture. If the gesture is a recognized gesture, process flow continues to block 226. If the gesture is not a recognized gesture, process flow continues to block 228. At block 226, the corresponding gesture event is output in response to the descriptor being classified. At block 228, a new classification and/or gesture is created in response to the descriptor not matching known gestures.

In embodiments, the descriptor values may be calculated for each hand type by flipping descriptor values. As used herein, hand type refers to a distinction between the left or right hand. Flipping descriptor values may be performed to simulate the left hand descriptor using the right hand data and vice versa. In embodiments, flipping the descriptor values is performed by swapping the right column with the left column in the 3×3 grid of cells. Also for each grid cell, the 8 bins in the cell also flipped. In particular, the 4 left side direction bins are swapped with the 4 right side direction bins. This results in a mirror of the descriptor along the vertical axis.

The present techniques enable a more robust hand gesture recognition mechanism by Integrating Y/Z motion vector histograms beyond the existing X/Y motion vector histograms. Additionally, the hand density map as a type of shape descriptor offers a rough estimate of the shape of the hand, independently from any motion vector data. Further, the present techniques enable a descriptor creation that combines both the depth and IR data, and also creates a robust and invariant to scale, rotation and hand type (left/right) descriptor. Using the depth data to get an accurate mask of the hand enables a small but reliable amount of feature points, which increases accuracy and performance. For the sake of simplicity, the present techniques are described as applying to depth and IR images. However, the same ideas can be applied on any subset of depth, IR, grayscale and RGB images with only minor modifications. For example, an RGB image can be used to create a whole hand motion vector instead of or in combination with IR data. In embodiments, a grayscale image may be calculated the RGB image and used to obtain the whole hand motion vector. In embodiments, both IR images and a grayscale image can be used to calculate the depth information, optical flow vectors, and to calculate the descriptor on the resulted optical flow vectors.

Moreover, the present techniques enable the use of the depth image in order to extract accurate hand mask, which enables a search for feature points that lay on the hand itself and ignores the noisy points in the background. In addition, the search is for a small number of points, which helps keep a low processing time. In addition to the magnitudes of the motion vectors, the feature vector is also based on its angles. Using the 8 bins of 45 degrees to calculate the histogram based optical flow vector eases the process of rotating the descriptor, and by that makes it invariant to rotation and hand type (left vs. right). Moreover, normalizing the motion vectors magnitudes into meter units (using the depth data) makes the descriptor to be invariant to scale. Further, the hand motion vector given by the hand tracker contributes to the gesture's state machine (e.g. gesture that can happen only when the hand is in static mode). Possible states of the state machine include hand closing gesture, hand opening gesture, and non-gesture.

Figure 3:
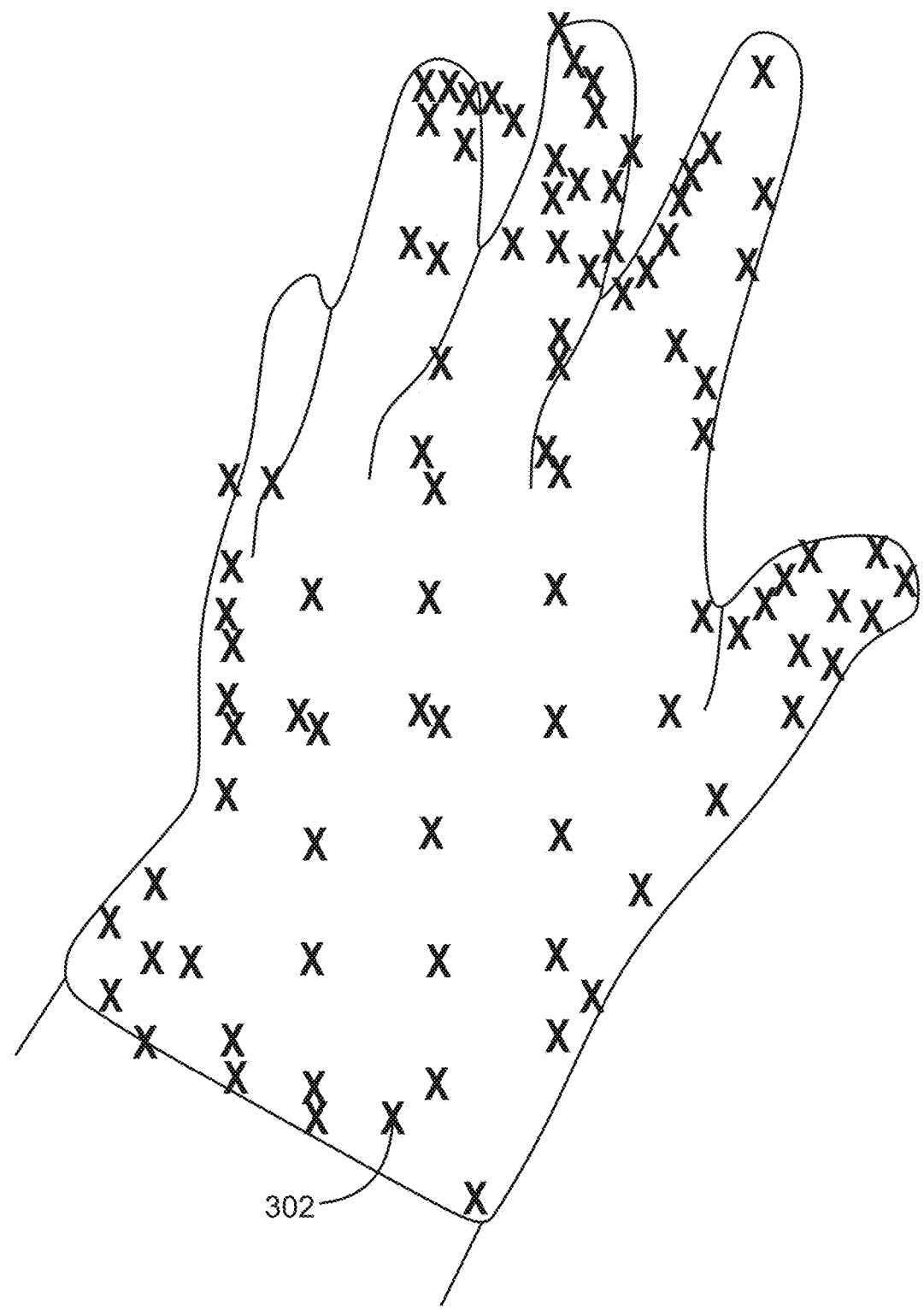
FIG. 3 is an infrared image.

FIG. 3 is a line drawing of an infrared image 300. The infrared image 300 includes an object for tracking, which is a hand 302. The hand 302 has a plurality of points along the hand 302. In embodiments, the feature points are represented by x's along the hand 302. Across the sequence of frames including the hand 302, the hand 302 may progress through a sequence of positions that result in a gesture across the plurality of frames. In embodiments, the feature points are a starting point of the good feature points to track. In embodiments, another method to find points to track is the use of a grid, which ensures dense coverage of optical flow. Motion vectors may be found by applying an optical flow to feature points found in each pair of frames, resulting in a plurality of motion vectors for each consecutive pair of frames.

Figure 4:
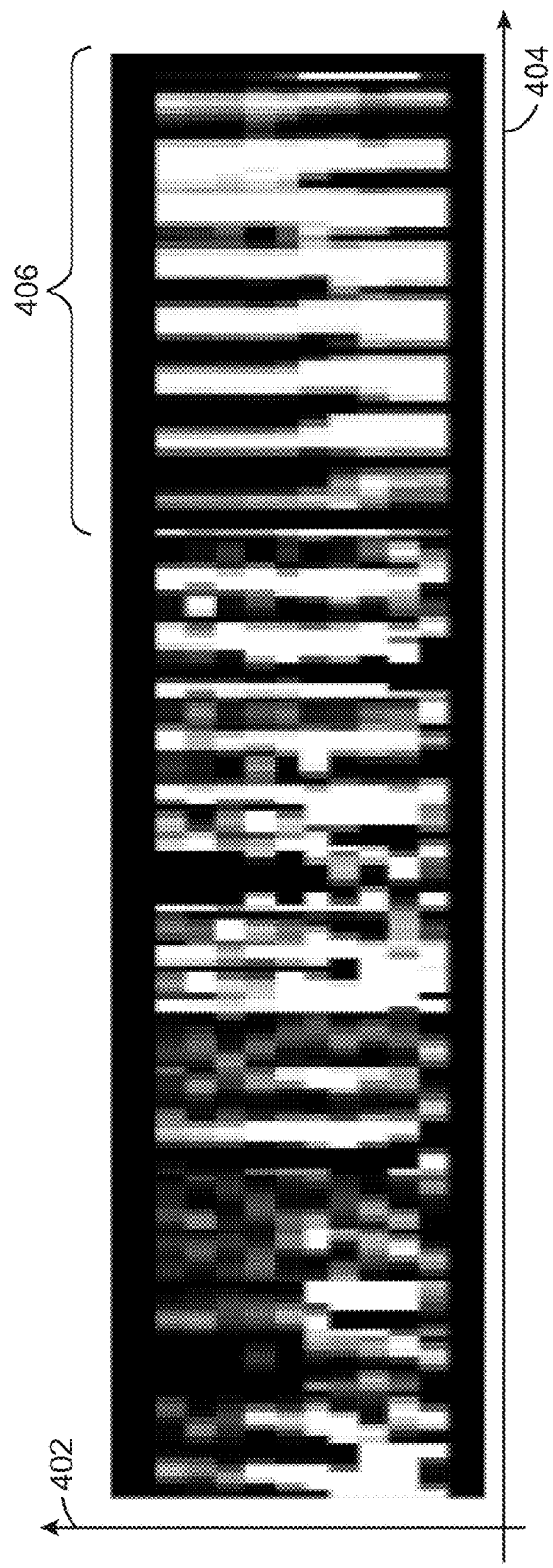
FIG. 4 is an illustration of a descriptor.

FIG. 4 is an illustration of a descriptor 400. In embodiments, the descriptor 400 is a full descriptor view, with a history of hand closing process on the Y axis 402, descriptor values on the X-axis 404. Notice the hand becomes denser with time (right quarter of diagram as indicated by reference number 406). In FIG. 4, the horizontal dimension 404 represents frames, where the left-most column is frame t, and the right-most is frame t−x, where x is the length of the history of frames that are concatenated into the descriptor. The Y dimension 402 represents the different elements in the descriptor, which is the concatenation of the X/Y HOOF values (for all cells), the Y/Z HOOF values and the shape descriptor. In FIG. 4, dark values represent low values (for shape descriptor, cells where the hand does not appear; for HOOFs, areas where there is no movement), and brighter values represent higher values (large movement for HOOFs, high hand density for shape descriptor).

Figure 5:
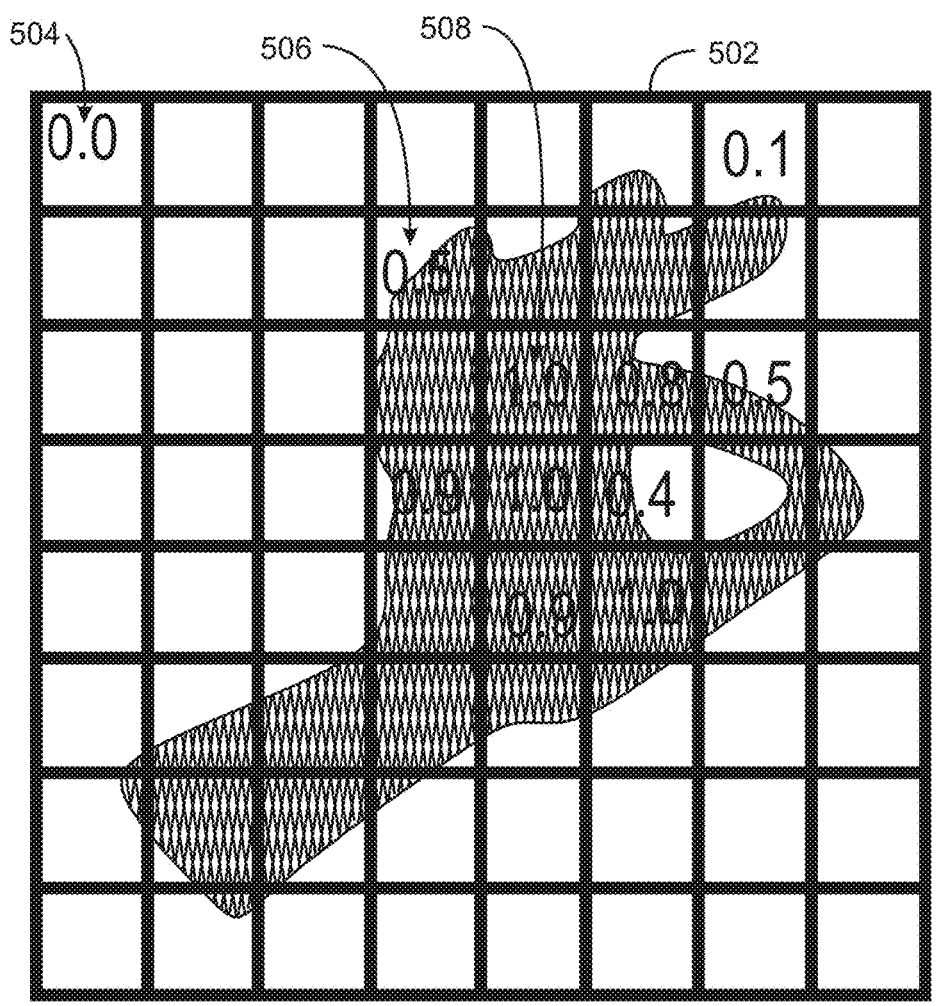
FIG. 5 is an illustration of a hand density map.

FIG. 5 is an illustration of a hand density map 500. The hand density map includes a hand 302 overlaid by a grid 502. The grid 502 may be of any size or shape. In the example of FIG. 5, the grid is an 8×8 grid. In embodiments, a ROI is divided to grid of 8×8 on the mask image of the hand. For each cell (8×8 cells), the percentage of the cell that is covered by the mask is calculated. Specifically, a cell has a value of 1.0 when it fully contains hand mask information and a value of 0.0 when no hand mask information occurs within the cell. For example, the value of cell 504 is 0.0. The value of cell 506 is 0.5, as half of the cell contains hand mask information. Finally, the value of the cell 508 is 1.0, since the entire cell contains hand mask information.

To calculate the image plane HOOF and the depth plane HOOF, a bounding box may be applied to the hand mask. The bounding box may be divided into a grid and an 8-bin histogram of optical flow is calculated for all motion vectors within each the cell of the grid. This results in a number of HOOF for the grid. For example, in a 3×3 bounding box, nine HOOF for the grid may be calculated. The plurality of HOOFs may be concatenated to one vector for each of the image plane and the depth plane. In embodiments, each HOOF may be an array of 8 values. All HOOF arrays are concatenated into one array (vector) of 72 values (which is 9 HOOFs, each HOOF contains 8 values per HOOF).

Figure 6:
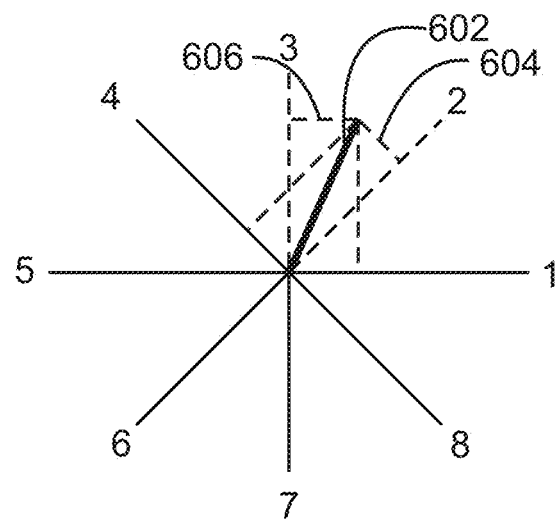
FIG. 6 is an illustration of a motion vector and its impact on each bin of the HOOF.

FIG. 6 is an illustration of a motion vector 602 and its impact on each bin of the HOOF. For ease of description, one motion vector is illustrated. However, a plurality of motion vectors may be found dependent upon the feature points found in each frame. In embodiments, the contribution to each bin is illustrated by boxes 604 and 606. The HOOF as described herein is an 8-bin histogram with 45 degrees for each bin. The equation below for $h_i(\theta)$ describes multiplying each flow value or motion vector by a unit vector to project the motion vectors into the HOOF. The $\varphi$ function below describes assigning a value of 0 to motion vectors that occur in a direction opposite of actual motion of the hand. Specifically, as illustrated in FIG. 6, for each ith spatial cell where $i \in \{1, \ldots, N \times N\}$ (N=3) and direction $\theta \in \{0, 45, 90, 135, 180, 225, 270, 315\}$ degrees, the optical flow histogram $h_i(\theta)$ is defined such that $$h_i(\theta) = \sum_{j \in B_i} \varphi(u_\theta * F_j)$$

where $F_j$ represents the flow value in each feature point j, $B_i$ is the set of feature points in the spatial bin i, and $u_\theta$ is the unit vector in $\theta$ direction and $\varphi$ function is defined as $$\varphi(x) = \begin{Bmatrix} 0 \text{ if } x \leq 0 \\ x \text{ if } x > 0 \end{Bmatrix}$$

By defining the HOOF as an 8-bin histogram with 45 degrees for each bin, the present techniques robust and invariant to scale, rotation and hand type (left/right). Thus, the descriptors previously recognized by a classification algorithm can be used to recognize a subsequent gesture based on its descriptor, regardless of the size, orientation, or hand type.

Figure 7:
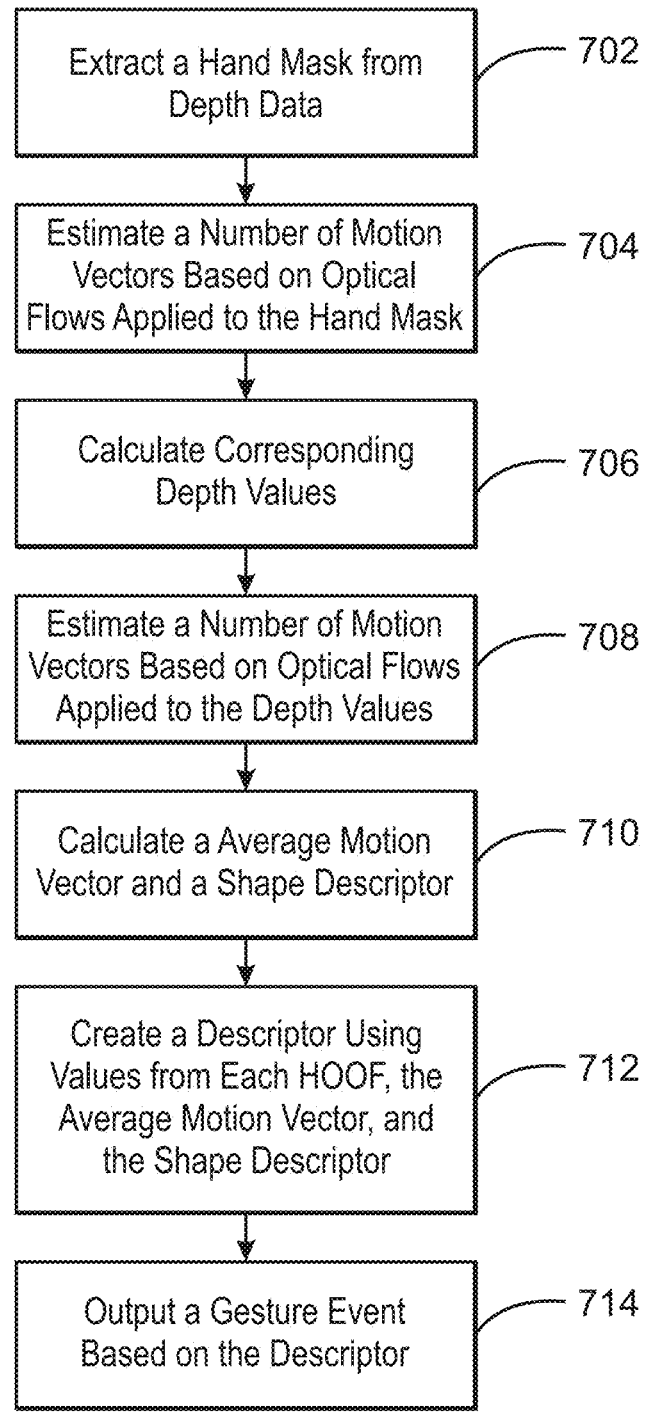
FIG. 7 is a process flow diagram of a method for hand gesture recognition for virtual reality and augmented reality applications.

FIG. 7 is a process flow diagram of a method 700 for hand gesture recognition for virtual reality and augmented reality applications. At block 702, a hand mask may be extracted from the depth data. To extract the hand mask as discussed above, the input may be a three dimensional (3D) image acquired by 3D camera which includes a depth image and IR image. The present techniques may also apply to a 2D image acquired by regular RGB with RGB to depth mapping. For every new frame the mask of the hand is extracted.

In an example, input images may be obtained, and the hand tracking may be performed with a sequence of images from a three dimensional (3D) camera. In embodiments, the sequence of images may be a sequence of a depth map, infrared, or color images. A depth image contains information relating to the distance of the surfaces of scene objects from a viewpoint. The infrared image is an image that displays the measured infrared (IR) light radiating from objects in its field of view. In some embodiments a 2D image is acquired by regular red, green, and blue (RGB) imaging with a translation from RGB to a depth map.

A foreground extractor algorithm is applied, combined with blob tracker to extract the hand mask from the frames. In embodiments, the hand mask is extracted from a frame that includes a depth image. The hand mask is a binary image, where all the pixels of the hand have a value equal to a first value, and all other pixels in the frame equal to a second value. For example, all the pixels of the hand may have a value equal to 255 while all other pixels in the frame have a value of 0. For every new frame the blob or mask of the hand is extracted. A foreground extractor algorithm is applied to each frame and combined with blob tracker. In this manner, frame to frame hand tracking can be performed and the mask or blob of the tracked hand is provided. As used herein, the foreground extractor is a module that separates the hand (foreground) from the background or everything else that is not the tracked object. The blob tracker is a module that tracks the hand from frame to frame, such that every foreground hand is attached to its corresponding hand from the previous frame.

At block 704, a number of motion vectors is estimated based on optical flows applied to the hand mask in consecutive frames. At block 706, depth values corresponding to the number of motion vectors may be calculated. In embodiments, those values that are outliers with respect to their neighbors are discarded. Outliers may be determined using two conditions. First, the Z movement (different between Z values in the source and destination points of the optical flow), minus the average Z movement of all motion vectors is smaller than a fixed threshold T1. The second condition is if the X/Y movement is smaller than threshold T2, then the Z movement (minus average Z movement for all motion vectors) is smaller than threshold T3 (where T3<T1).

At block 708, another number of motion vectors based on optical flows applied to the depth values may be calculated. Here, the Y/Z motion vectors are calculated. At block 710, an average motion vector is estimated based on the optical flows. The optical flows may be run on an IR image, RGB image, a greyscale image, or any other color model or color representation.

In embodiments, frame to frame object tracking may be performed to obtain an estimation of motion vectors. The object tracking may be based on feature points. Good feature points to track are located on the previous image. Good feature points can be found using Harris corner algorithm and they must be on the hand mask. In embodiments, an alternative method to using good feature points is using a grid to select points designated for optical flow calculation. For each point found on the previous image, the corresponding point is found in the current image using an optical flow algorithm. The vector between the previous point and the current point is defined to be the motion vector of this point.

The histogram of these motion vectors enables the corresponding depth value of each source and destination point to be found. An optical flow determination is performed on the feature points and the depth values enable depth motion data to be represented by the descriptor. Based on the motion of each individual feature point, the motion of the hand is described in three dimensions. In embodiments, the optical flow determines a pattern of apparent motion of objects, surfaces, and edges in the scene. The optical flow is used to determine the motion vectors of the feature points between consecutive frames. The movement of objects in a sequence of frames may be analyzed to obtain vectors that represent the estimated motion of the hand between frames. In embodiments, the frame is divided into macroblocks, and the motion vectors represent the change in position of a macroblock between frames. The optical flow may be performed using the Lucas-Kanade optical flow or Gunnar Farneback's algorithm. In embodiments, the optical flow can be implemented by any algorithm that enables frame to frame pixel tracking.

The hand mask may be tracked using a corner detection technique. The feature points are used as a starting point for the optical flow. The optical flow algorithm finds, for each feature point, the corresponding point in the next frame. These feature points should be good, or informative, to correctly track the object. In particular, the feature points must be on the hand mask, and not on the background. In embodiments, feature points describing the hand mask may be obtained via corner detection. A feature point is a point in an image which contains information regarding the structure of the image. Typically, image components such as corners and crosses of the hand indicate a good feature point, where a good feature point is one that can describe corners, crosses, or edges of an object. Additionally, good feature points may be locally unique, spatial localized, and scale invariant. Corners of the hand may be good feature points because they have large intensity differences in two different directions. Additionally, corners are likely to be locally unique and spatially localized.

Corner detection algorithms may provide a numerical score for each pixel of each frame. The score is a measure of the likelihood that the pixel is as a feature point that is detectable in the sequence of frames. An example corner detection algorithm is the Harris Corner algorithm. A threshold may be applied to the score found by the Harris Corner algorithm to distinguish good feature points from the set of feature points found by the Harris Corner algorithm. The good feature points that have been determined to define an object of interest can be used to provide accurate motion vectors in a sequence of frames. In this manner, the motion of each individual hand in the scene is computed.

Once the hand mask is extracted, motion vectors can be found and the hand gesture may be classified based on the motion vectors. In some cases, an estimation of the hand movement is performed. The estimation may be performed using the smallest half of the motion vectors that were extracted from the optical flow. The smallest half of the motion vectors may be averaged into a mean motion vector. To classify hand gesture based on motion vectors, a final descriptor may be built from K consecutive frames. At block 712, the final descriptor (figure 400) is built from K consecutive frames. Each frame is represented by a vector of 211 values. The first 72 values are the HOOF for X/Y dimensions; the next 72 values are HOOF in the Y/Z dimension, the next 3 values are the hand motion vector, the next 64 values are the hand density map. Accordingly, the values from the X/Y HOOF, the Y/Z HOOF, the whole hand motion values vector, and the hand density map may be used form a descriptor. For example, for each frame, there is a total of 8 bins*9 cells=72 values for the X/Y HOOF and a total of 8 bins*9 cells=72 values for the Y/Z HOOF. The motion vector of the hand may be represented by 3 values. The hand density map may be added, which represents the shape of the hand (figure 500) Thus, for each frame there are a total of 211 values. To build the descriptor, each descriptor includes K frames. The number of frames can vary and depends on the detected gesture. Shorter gestures (in time) need less frames. By concatenating K frames the result is one descriptor (figure 400).

The number of motion vectors may be concatenated into a single frame feature vector. To build a single frame feature vector, the motion vectors are normalized into meter units, depending on the distance between the hand and the camera. The bounding box of the hand mask is calculated. In embodiments, the bounding box may be determined by finding an area of least volume that contains the hand mask. Next the bounding box may be divided into a grid. After the bounding box is divided into a grid, the motion descriptors are determined by first computing an 8-bin HOOF of all motion vectors in each cell of the grid. Additionally, the motion vector may be normalized into meter units. For each motion vector in a cell, the energy from the motion vector is added to 4 different bins, as illustrated by FIG. 6. The computed HOOF values are divided by the number of motion vectors that were used in building this histogram to get the average value of each bin. Thus, each cell has eight values, resulting in 72 values.

Once the full descriptor is generated, machine learning algorithm (e.g. Random Forest in our system) is applied in order to classify the gestures. At block 714, a gesture event may be output based on the descriptor. In embodiments, once the full descriptor is generated, a machine learning algorithm may be applied in order to classify the gesture.

Figure 8:
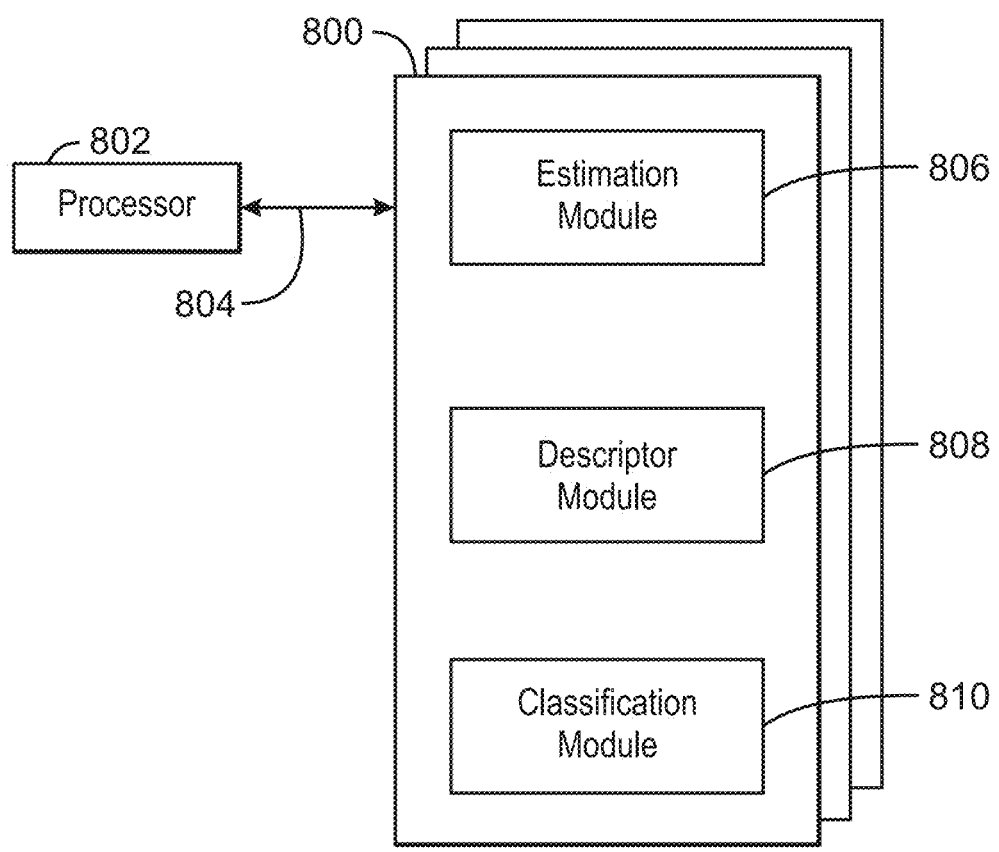
FIG. 8 is a block diagram showing a medium that contains logic for enabling a tracker for cursor navigation.

FIG. 8 is a block diagram showing a medium 800 that contains logic for enabling a tracker for cursor navigation. The medium 800 may be a computer-readable medium, including a non-transitory medium that stores code that can be accessed by a processor 802 over a computer bus 804. For example, the computer-readable medium 800 can be volatile or non-volatile data storage device. The medium 800 can also be a logic unit, such as an Application Specific Integrated Circuit (ASIC), a Field Programmable Gate Array (FPGA), or an arrangement of logic gates implemented in one or more integrated circuits, for example.

The medium 800 may include modules 806-810 configured to perform the techniques described herein. For example, an estimation module 806 may be configured to estimate a number of motion vectors and an average motion vector. The motion vectors may be both X/Y motion vectors and Y/Z motion vectors. A descriptor module 808 may be configured to calculate a full descriptor that includes single frame descriptors for K-frames. A classification module 810 may be configured to classify the gesture and output a gesture event based on the descriptor. In some embodiments, the modules 806-810 may be modules of computer code configured to direct the operations of the processor 802.

The block diagram of FIG. 8 is not intended to indicate that the medium 800 is to include all of the components shown in FIG. 8. Further, the medium 800 may include any number of additional components not shown in FIG. 8, depending on the details of the specific implementation.

The present techniques enable the use of Y/Z motion vector histograms that offer data which might be missing from the image plane alone. For instance, a hand moving towards the camera will result in motion vectors which are all moving away from the center of the hand, similar to a hand opening gesture. However, in the Y/Z histogram it will be evident that there is also a consistent movement along the Z axis, data which will enable a classifier to correctly classify this sample. Additionally, the use of a shape descriptor offers a fallback from situations where motion vector data is missing or noisy. For example, a gloved hand may present a challenge for motion vector creation, or a movement where the fingers disappear behind the hand (as in the case of VR) may create noise in motion vector data. Using a different source of data enables a classifier to learn gestures even when motion vector data is noisy or missing. In particular, the present techniques result in considerable improvements in the following scenarios. First, hand tapping (pushing forward & back), which were formerly misclassified as hand opening and closing, are now correctly classified. Second, results when the hand movement is quick or fingers are partly obscured were greatly improved by the shape descriptor. Finally, the effects of global motion, such as in the case where a camera mounted on a VR device (head-mounted) moves, are mitigated by the use of the shape descriptor, which is hardly effected by global motion.

Example 1 is a system for hand gesture recognition. The system includes a display; a camera; a memory that is to store instructions and that is communicatively coupled to the camera and the display; and a processor communicatively coupled to the camera, the display, and the memory, wherein when the processor is to execute the instructions, the processor is to: estimate one or more motion vectors of an object using a pair of consecutive frames; estimate an average motion vector of the object; determine a first histogram of optical flow (HOOF) based on the one or more motion vectors and the average motion vector; determine depth values based on the first HOOF; determine a second histogram of optical flow (HOOF) based on the depth values; calculate a descriptor using the first HOOF, the second HOOF, a shape descriptor, and an average motion vector; and classify the descriptor as a gesture.

Example 2 includes the system of example 1, including or excluding optional features. In this example, the system includes extracting a mask of the object using a depth image; and applying the optical flow to the mask of the object to obtain the one or more motion vectors.

Example 3 includes the system of any one of examples 1 to 2, including or excluding optional features. In this example, the histogram of the optical flow (HOOF) of the one or more motion vectors is built using a Lucas-Kanade optical flow algorithm.

Example 4 includes the system of any one of examples 1 to 3, including or excluding optional features. In this example, the histogram values and the average motion vectors are concatenated for a plurality of frames to obtain the descriptor.

Example 5 includes the system of any one of examples 1 to 4, including or excluding optional features. In this example, each descriptor includes histogram values and the average motion vector for K frames, wherein the value of K is dependent on the type of gesture.

Example 6 includes the system of any one of examples 1 to 5, including or excluding optional features. In this example, a machine learning algorithm is used to classify the descriptor as a gesture.

Example 7 includes the system of any one of examples 1 to 6, including or excluding optional features. In this example, the one or more motion vectors is calculated via an optical flow algorithm of a mask applied an infrared image, a red, green, blue (RGB) image, or a grayscale image.

Example 8 includes the system of any one of examples 1 to 7, including or excluding optional features. In this example, the average motion vector is estimated using good feature points are determined by corner tracking.

Example 9 includes the system of any one of examples 1 to 8, including or excluding optional features. In this example, the object is a hand.

Example 10 includes the system of any one of examples 1 to 9, including or excluding optional features. In this example, the gesture is used to control a cursor.

Example 11 is a method. The method includes extracting a hand mask using depth data; estimating a first plurality of motion vectors based via an optical flow applied to the hand mask; estimating an average motion vector from the optical flow; estimating a second plurality of motion vectors via depth values derived from the first plurality of motion vectors; generating a descriptor based on a histogram of optical flow applied to the first plurality of motion vectors, the second plurality of motion vectors, the hand mask, and the average motion vector; and classifying the descriptor as a gesture.

Example 12 includes the method of example 11, including or excluding optional features. In this example, the histogram of optical flow is calculated for a plurality of cells of a frame, and a value is calculated for each bin of the histogram of optical flow by average values of the bin. Optionally, the average bin values and the average motion vector are concatenated for a plurality of frames to generate the descriptor.

Example 13 includes the method of any one of examples 11 to 12, including or excluding optional features. In this example, the method includes obtaining the plurality of motion vectors for a plurality of good feature points in a sequence of frames; selecting the motion vectors with a lowest length; and averaging the motion vectors with the lowest length to obtain the average motion vector.

Example 14 includes the method of any one of examples 11 to 13, including or excluding optional features. In this example, the descriptor is invariant to rotation and hand type.

Example 15 includes the method of any one of examples 11 to 14, including or excluding optional features. In this example, a movement corresponding to the gesture is applied to a cursor rendered on a display.

Example 16 includes the method of any one of examples 11 to 15, including or excluding optional features. In this example, each descriptor includes a concatenated plurality of histogram values and the average motion vector for K frames, wherein the value of K is dependent on a type of the gesture.

Example 17 includes the method of any one of examples 11 to 16, including or excluding optional features. In this example, a machine learning algorithm is used to classify the descriptor as a gesture.

Example 18 includes the method of any one of examples 11 to 17, including or excluding optional features. In this example, the hand mask is applied to an infrared image, a red, green, blue (RGB) image, or a grayscale image to estimate the plurality of motion vectors.

Example 19 includes the method of any one of examples 11 to 18, including or excluding optional features. In this example, the plurality of motion vectors and the average motion vector are estimated via frame to frame pixel tracking.

Example 20 is an apparatus for hand gesture recognition. The apparatus includes an image capture mechanism to obtain a sequence of frames; an estimator to estimate a first plurality of motion vectors, a second plurality of motion vectors, and an average motion vector for each frame of the sequence of frames; a generator to generate a descriptor based on a first histogram of the first plurality of motion vectors, a second histogram based on the second plurality of motion vectors, a shape descriptor, and the average motion vector for the sequence of frames; and a classifier to classify the descriptor as a gesture.

Example 21 includes the apparatus of example 20, including or excluding optional features. In this example, the histogram is a histogram of optical flow, and the one or more motion vectors is projected onto the histogram of optical flow.

Example 22 includes the apparatus of any one of examples 20 to 21, including or excluding optional features. In this example, a frame is divided into a plurality of cells, and a histogram of optical flow is calculated for each cell, and in each bin the histogram of optical flow is averaged to obtain the single frame feature vector that comprises histogram values.

Example 23 includes the apparatus of any one of examples 20 to 22, including or excluding optional features. In this example, histogram values and the average motion vector for each frame of the sequence of frames are concatenated to generate the descriptor.

Example 24 includes the apparatus of any one of examples 20 to 23, including or excluding optional features. In this example, each descriptor includes a set of histogram values and the average motion vector for K frames, wherein the value of K is dependent on the type of gesture.

Example 25 includes the apparatus of any one of examples 20 to 24, including or excluding optional features. In this example, the classifier includes a machine learning algorithm.

Example 26 includes the apparatus of any one of examples 20 to 25, including or excluding optional features. In this example, the average motion vector is based on good feature points of a mask applied to an infrared image, a red, green, blue (RGB) image, or a grayscale image.

Example 27 includes the apparatus of any one of examples 20 to 26, including or excluding optional features. In this example, the plurality of motion vectors is based on an optical flow applied to a hand mask.

Example 28 includes the apparatus of any one of examples 20 to 27, including or excluding optional features. In this example, a hand mask is extracted from each frame of the sequence of frames to estimate the plurality of motion vectors.

Example 29 includes the apparatus of any one of examples 20 to 28, including or excluding optional features. In this example, the gesture is used to control a cursor.

Example 30 is a tangible, non-transitory, computer-readable medium. The computer-readable medium includes instructions that direct the processor to estimate one or more motion vectors of an object using a pair of consecutive frames; estimate an average motion vector of the object; determine a first histogram of optical flow (HOOF) based on the one or more motion vectors and the average motion vector; determine depth values based on the first HOOF; determine a second histogram of optical flow (HOOF) based on the depth values; calculate a descriptor using the first HOOF, the second HOOF, a shape descriptor, and an average motion vector; and classify the descriptor as a gesture.

Example 31 includes the computer-readable medium of example 30, including or excluding optional features. In this example, the histogram of optical flow is calculated for a plurality of cells of a frame, and a value is calculated for each bin of the histogram of optical flow by average values of the bin. Optionally, the average bin values and the average motion vector are concatenated for a plurality of frames to generate the descriptor.

Example 32 includes the computer-readable medium of any one of examples 30 to 31, including or excluding optional features. In this example, the computer-readable medium includes obtaining the plurality of motion vectors for a plurality of good feature points in a sequence of frames; selecting the motion vectors with a lowest length; and averaging the motion vectors with the lowest length to obtain the average motion vector.

Example 33 includes the computer-readable medium of any one of examples 30 to 32, including or excluding optional features. In this example, the descriptor is invariant to rotation and hand type.

Example 34 includes the computer-readable medium of any one of examples 30 to 33, including or excluding optional features. In this example, a movement corresponding to the gesture is applied to a cursor rendered on a display.

Example 35 includes the computer-readable medium of any one of examples 30 to 34, including or excluding optional features. In this example, each descriptor includes a concatenated plurality of histogram values and the average motion vector for K frames, wherein the value of K is dependent on a type of the gesture.

Example 36 includes the computer-readable medium of any one of examples 30 to 35, including or excluding optional features. In this example, a machine learning algorithm is used to classify the descriptor as a gesture.

Example 37 includes the computer-readable medium of any one of examples 30 to 36, including or excluding optional features. In this example, the hand mask is applied to an infrared image, a red, green, blue (RGB) image, or a grayscale image to estimate the plurality of motion vectors.

Example 38 includes the computer-readable medium of any one of examples 30 to 37, including or excluding optional features. In this example, the plurality of motion vectors and the average motion vector are estimated via frame to frame pixel tracking.

Example 39 is an apparatus for hand gesture recognition. The apparatus includes instructions that direct the processor to an image capture mechanism to obtain a sequence of frames; a means to estimate a first plurality of motion vectors, a second plurality of motion vectors, and an average motion vector for each frame of the sequence of frames; a means to generate a descriptor based on a first histogram of the first plurality of motion vectors, a second histogram based on the second plurality of motion vectors, a shape descriptor, and the average motion vector for the sequence of frames; and a classifier to classify the descriptor as a gesture.

Example 40 includes the apparatus of example 39, including or excluding optional features. In this example, the first histogram is a histogram of optical flow, and the one or more motion vectors is projected onto the histogram of optical flow.

Example 41 includes the apparatus of any one of examples 39 to 40, including or excluding optional features. In this example, the second histogram is a histogram of optical flow based on a plurality of depth values.

Example 42 includes the apparatus of any one of examples 39 to 41, including or excluding optional features. In this example, a frame is divided into a plurality of cells, and a histogram of optical flow is calculated for each cell, and each bin the histogram of optical flow is averaged to obtain the single frame feature vector that comprises histogram values.

Example 43 includes the apparatus of any one of examples 39 to 42, including or excluding optional features. In this example, histogram values and the average motion vector for each frame of the sequence of frames are concatenated to generate the descriptor.

Example 44 includes the apparatus of any one of examples 39 to 43, including or excluding optional features. In this example, each descriptor includes a set of histogram values and the average motion vector for K frames, wherein the value of K is dependent on the type of gesture.

Example 45 includes the apparatus of any one of examples 39 to 44, including or excluding optional features. In this example, the classifier includes a machine learning algorithm.

Example 46 includes the apparatus of any one of examples 39 to 45, including or excluding optional features. In this example, the average motion vector is based on good feature points of a mask applied to an infrared image, a red, green, blue (RGB) image, or a grayscale image.

Example 47 includes the apparatus of any one of examples 39 to 46, including or excluding optional features. In this example, the plurality of motion vectors is based on an optical flow applied to a hand mask.

Example 48 includes the apparatus of any one of examples 39 to 47, including or excluding optional features. In this example, a hand mask is extracted from each frame of the sequence of frames to estimate the plurality of motion vectors.

Example 49 includes the apparatus of any one of examples 39 to 48, including or excluding optional features. In this example, the gesture is used to control a cursor.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for hand gesture recognition, comprising:
   a display;
   a camera;
   a memory that is to store instructions and that is communicatively coupled to the camera and the display; and
   a processor communicatively coupled to the camera, the display, and the memory, wherein when the processor is to execute the instructions, the processor is to:
      estimate one or more motion vectors of an object using a pair of consecutive frames;
      estimate an average motion vector of the object;
      determine a first histogram of optical flow (HOOF) based on the one or more motion vectors and the average motion vector;
      determine depth values based on the first HOOF;
      determine a second histogram of optical flow (HOOF) based on the depth values;
      calculate a descriptor using the first HOOF, the second HOOF, a shape descriptor, and an average motion vector; and
      classify the descriptor as a gesture.

2. The system of claim 1, comprising:
   extracting a mask of the object using a depth image; and applying the optical flow to the mask of the object to obtain the one or more motion vectors.

3. The system of claim 1, wherein the first histogram of the optical flow (HOOF) based on the one or more motion vectors is built using a Lucas-Kanade optical flow algorithm.

4. The system of claim 1, wherein histogram values and the average motion vectors are concatenated for a plurality of frames to obtain the descriptor.

5. The system of claim 1, wherein the descriptor includes a histogram value and the average motion vector for K frames, wherein the value of K is dependent on a type of gesture.

6. The system of claim 1, wherein a machine learning algorithm is used to classify the descriptor as a gesture.

7. The system of claim 1, wherein the one or more motion vectors is calculated via an optical flow algorithm of a mask applied an infrared image, a red, green, blue (RGB) image, or a grayscale image.

8. The system of claim 1, wherein the average motion vector is estimated using good feature points determined by corner tracking.

9. The system of claim 1, wherein the object is a hand.

10. The system of claim 1, wherein the gesture is used to control a cursor.

11. A method, comprising:
extracting a hand mask using depth data;
estimating a first plurality of motion vectors based via an optical flow applied to the hand mask;
estimating an average motion vector from the optical flow;
estimating a second plurality of motion vectors via depth values derived from the first plurality of motion vectors;
generating a descriptor based on a histogram of optical flow applied to the first plurality of motion vectors, the second plurality of motion vectors, the hand mask, and the average motion vector; and
classifying the descriptor as a gesture.

12. The method of claim 11, wherein the histogram of optical flow is calculated for a plurality of cells of a frame, and a value is calculated for each bin of the histogram of optical flow from average values of the bin.

13. The method of claim 12, wherein the average bin values and the average motion vector are concatenated for a plurality of frames to generate the descriptor.

14. The method of claim 11, comprising:
obtaining the plurality of motion vectors for a plurality of good feature points in a sequence of frames;
selecting the motion vectors with a lowest length; and
averaging the motion vectors with the lowest length to obtain the average motion vector.

15. The method of claim 11, wherein the descriptor is invariant to rotation and hand type.

16. The method of claim 11, wherein a movement corresponding to the gesture is applied to a cursor rendered on a display.

17. An apparatus for hand gesture recognition, comprising:
an image capture mechanism to obtain a sequence of frames;
an estimator to estimate a first plurality of motion vectors, a second plurality of motion vectors, and an average motion vector for each frame of the sequence of frames;
a generator to generate a descriptor based on a first histogram of the first plurality of motion vectors, a second histogram based on the second plurality of motion vectors, a shape descriptor, and the average motion vector for the sequence of frames; and
a classifier to classify the descriptor as a gesture.

18. The apparatus of claim 17, wherein the histogram is a histogram of optical flow, and the one or more motion vectors is projected onto the histogram of optical flow.

19. The apparatus of claim 17, wherein a frame is divided into a plurality of cells, and a histogram of optical flow is calculated for each cell, and in each bin the histogram of optical flow is averaged to obtain a single frame feature vector that comprises histogram values.

20. The apparatus of claim 17, wherein histogram values and the average motion vector for each frame of the sequence of frames are concatenated to generate the descriptor.

21. The apparatus of claim 17, wherein the descriptor includes a set of histogram values and the average motion vector for K frames, wherein the value of K is dependent on a type of the gesture.

22. A tangible, non-transitory, computer-readable medium comprising instructions that, when executed by a processor, direct the processor to:
extract a hand mask using depth data;
estimate a first plurality of motion vectors via an optical flow applied to the hand mask;
estimate an average motion vector from the optical flow;
estimate a second plurality of motion vectors via depth values derived from the first plurality of motion vectors;
generate a descriptor based on a histogram of optical flow applied to the hand mask and the average motion vector; and
classify the descriptor as a gesture.

23. The computer readable medium of claim 22, wherein the descriptor includes a concatenated plurality of histogram values and the average motion vector for K frames, wherein the value of K is dependent on a type of the gesture.

24. The computer readable medium of claim 22, wherein a machine learning algorithm is used to classify the descriptor as the gesture.

25. The computer readable medium of claim 22, wherein the hand mask is applied to an infrared image, a red, green, blue (RGB) image, or a grayscale image to estimate the first plurality of motion vectors.

* * * * *